United States Patent
Bhandari et al.

(10) Patent No.: US 10,712,766 B2
(45) Date of Patent: Jul. 14, 2020

(54) HYPERVISORS TIMER TECHNIQUES

(71) Applicant: Microsoft Technology Licensing, LLC, Redmond, WA (US)

(72) Inventors: Aditya Bhandari, Seattle, WA (US); Bruce J. Sherwin, Jr., Woodinville, WA (US); Xin David Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 15/875,880

(22) Filed: Jan. 19, 2018

(65) Prior Publication Data

US 2019/0087215 A1    Mar. 21, 2019

Related U.S. Application Data

(60) Provisional application No. 62/560,565, filed on Sep. 19, 2017.

(51) Int. Cl.
| | |
|---|---|
| *G06F 9/46* | (2006.01) |
| *G06F 1/06* | (2006.01) |
| *G06F 9/455* | (2018.01) |
| *G06F 9/48* | (2006.01) |

(52) U.S. Cl.
CPC ............ *G06F 1/06* (2013.01); *G06F 9/45558* (2013.01); *G06F 9/4856* (2013.01); *G06F 2009/4557* (2013.01); *G06F 2009/45575* (2013.01); *G06F 2009/45579* (2013.01); *G06F 2009/45587* (2013.01)

(58) Field of Classification Search
CPC ......... G06F 1/06; G06F 9/4558; G06F 9/4856
USPC .............................................................. 718/1
See application file for complete search history.

(56) References Cited

U.S. PATENT DOCUMENTS

| | | | |
|---|---|---|---|
| 5,530,905 A * | 6/1996 | Nichols ................... | H04L 29/00 709/203 |
| 7,475,002 B1 * | 1/2009 | Mann ................... | G06F 9/45558 703/21 |
| 2010/0250230 A1 | 9/2010 | Ganguly et al. | |
| 2011/0047315 A1 | 2/2011 | De dinechin et al. | |

(Continued)

OTHER PUBLICATIONS

"International Search Report and Written Opinion Issued in PCT Application No. PCT/US2018/038881", dated Oct. 2, 2018, 13 pages.

(Continued)

*Primary Examiner* — Camquy Truong

(57) ABSTRACT

This disclosure generally relates to time and timer techniques that may be used to virtualize one or more virtual machines. In an example, it may be possible to save and restore a timer of a virtual machine while preserving timer information associated with the timer (e.g., an expiration time, whether the most recent expiration has been signaled, and the enable bit, etc.). For example, a first mode may enable restoring a timer based on a previously-existing enable bit, thereby retaining the state of the timer (e.g., whether the timer is programmed to fire and/or whether the most recent expiration has been signaled). By contrast, a second mode of setting a timer may automatically set the enable bit, thereby automatically enabling the timer to fire, as may be expected by a virtual machine when setting a timer.

20 Claims, 10 Drawing Sheets

(56) References Cited

U.S. PATENT DOCUMENTS

| | | | |
|---|---|---|---|
| 2012/0117564 A1* | 5/2012 | Friebel | G06F 9/45541 718/1 |
| 2013/0160012 A1 | 6/2013 | Ganguly et al. | |
| 2014/0317633 A1 | 10/2014 | Zhai | |
| 2018/0006896 A1* | 1/2018 | Macnamara | G06F 3/0617 |
| 2019/0086948 A1 | 3/2019 | Bhandari et al. | |

OTHER PUBLICATIONS

"International Search Report and Written Opinion Issued in PCT Application No. PCT/US2018/038887", dated Oct. 10, 2018, 13 pages.

"Non Final Office Action Issued in U.S. Appl. No. 15/875,772", dated Nov. 29, 2019, 7 pages.

* cited by examiner

HYPERVISORS TIMER TECHNIQUES

CROSS-REFERENCE TO RELATED APPLICATION

This application claims priority to U.S. Provisional Application No. 62/560,565, entitled "Hypervisor Clock and Timer Techniques," filed on Sep. 19, 2017, the entire disclosure of which is hereby incorporated by reference in its entirety.

BACKGROUND

In a virtualized environment, a guest operating system may rely on a clock and set timers during normal execution of the virtual machine. However, if the virtual machine is suspended and/or migrated between host machines, it may be difficult to ensure that a consistent execution environment is provided for the virtualized guest. For example, the clock on the new host machine may operate at a different frequency as compared to the old physical host, or timer states may not be preserved.

It is with respect to these and other general considerations that examples have been described. Also, although relatively specific problems have been discussed, it should be understood that the examples should not be limited to solving the specific problems identified in the background.

SUMMARY

This disclosure generally relates to time and timer techniques that may be used to virtualize one or more virtual machines. In order to ensure consistent time information and preserve timers when suspending and resuming a virtual machine, or when performing a live migration, a host machine (e.g., a hypervisor, hardware of the host machine, etc.) may provide a clock having a pre-specified or known frequency and may enable varying modes for setting timers.

A plurality of host machines may each have clocks that operate at pre-determined or known frequencies, such that it may be possible to easily migrate a virtual machine from one host machine to another host machine using an offset so as to provide consistent time information to the virtual machine. In some examples, a scale factor or multiplier may also be used in order to achieve a consistent frequency. For example, a first host machine may have a clock operating at 1 GHz, while a second host machine may have a clock operating at 500 MHz. In such an example, a multiplier may be used to double the frequency of the second host machine in order to match the clock of the first host machine so as to provide consistent time information to the virtual machine.

Further, it may be possible to save and restore a timer of a virtual machine while preserving timer information associated with the timer (e.g., an expiration time, whether the most recent expiration has been signaled, and the enable bit, etc.). For example, a first mode may enable restoring a timer based on a previously-existing enable bit, thereby retaining the state of the timer (e.g., whether the timer is programmed to fire and/or whether the most recent expiration has been signaled). By contrast, a second mode of setting a timer may automatically set the enable bit, thereby automatically enabling the timer to fire, as may be expected by a virtual machine when setting a timer.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In some examples, saving and restoring timers associated with a virtual machine may be difficult, as some host machines may automatically enable a timer when the timer is restored, thereby making it difficult to adequately restore the timer. As such, aspects disclosed herein relate to saving and restoring a timer of a virtual machine while preserving timer information associated with the timer (e.g., an expiration time, whether the most recent expiration has been signaled, and the enable bit, etc.). For example, a first mode may enable restoring a timer based on a previously-existing enable bit, thereby retaining the state of the timer (e.g., whether the timer is programmed to fire and/or whether the most recent expiration has been signaled). By contrast, a second mode of setting a timer may automatically set the enable bit, thereby automatically enabling the timer to fire, as may be expected by a virtual machine when setting a timer.

Figure 1:
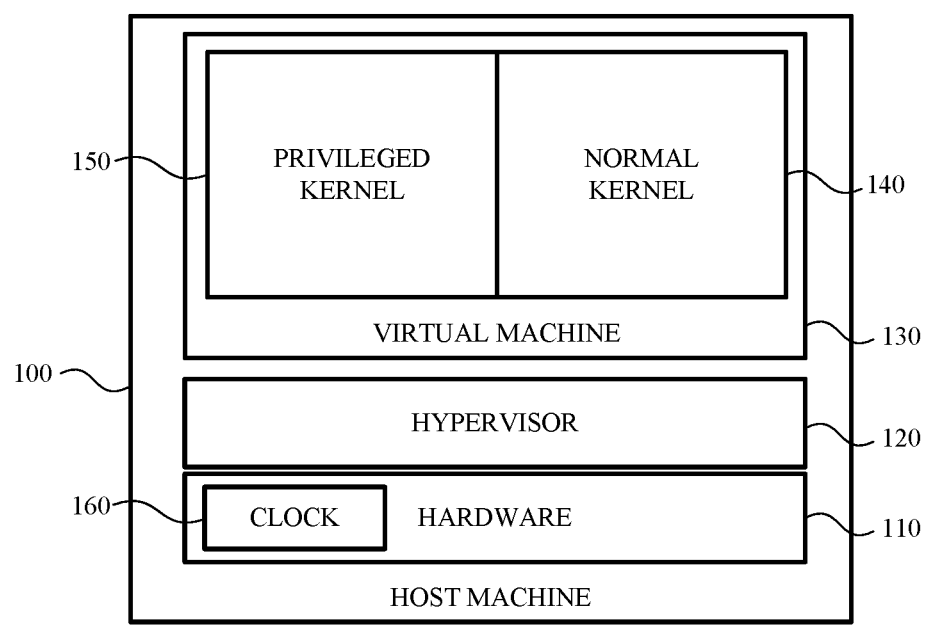
FIG. 1 illustrates an example host machine on which aspects disclosed herein may be practiced.

FIG. 1 illustrates an example host machine 100 on which aspects disclosed herein may be practiced. In some implementations, the host machine 100 may be any computing device capable of launching one or more virtual machines, such as, for example, virtual machine 130. The host machine 100 may be a desktop computer, a laptop computer, a mobile computing device, a tablet computing device, a wearable computing device, a gaming device and so on.

As shown in FIG. 1, the host machine 100 may include hardware 110. The hardware 110 may include one or more processors, one or more storage devices, one or more memory devices and so on. As illustrated, the hardware 110 comprises the clock 160, which may be used by aspects of the host machine 100 to determine time information. For example, software executing on the host machine 100 (e.g., the hypervisor 120, the virtual machine 130, etc.) may request time information from the clock 160 in order to determine how much time has elapsed, to generate a time stamp, to provide a system timer, or to synchronize instruction execution, among other examples.

In an example, the clock 160 may have a pre-specified or known frequency. For example, the clock 160 may have a frequency of 1 GHz and a different host machine similar to the host machine 100 may also have a clock with a frequency of 1 GHz. As such, performing a live migration of the virtual machine 130 may be simplified as a result of the clocks having a similar frequency. By contrast, migrating the virtual machine 130 to a host machine 100 that does not have a clock with a similar frequency may require additional computations in order to adapt the clock to provide similar time information as the host machine 100. It will be appreciated that a similar frequency may be provided by a clock with the same frequency as the clock 160 (e.g., 1 GHz) or by a clock having a frequency that may be scaled (e.g., multiplied) to the frequency of the clock 160 (e.g., a 500 MHz clock may be multiplied by two to provide a 1 GHz clock). In another example, the clock 160 may be a clock for which a frequency may be specified, such that a consistent frequency may be requested from the clock 160. In some examples, the frequency of the clock 160 may vary (e.g., according to processor load, power constraints, etc.), such that the frequency may be scaled accordingly in order to provide a consistent frequency to the virtual machine 130. It will be appreciated that while example clock frequencies are described herein, any of a variety of frequencies may be used.

In the example shown in FIG. 1, the host machine 100 also includes a hypervisor 120. In some cases, the hypervisor 120 may be software, hardware, firmware or a combination thereof. As will be explained in more detail below, the hypervisor 120 is configured to create, run and/or manage one or more virtual machines 130. In some examples, the virtual machine 130 may request time information from the clock 160. The clock 160 may be adapted according to an offset so as to provide consistent time information. For example, if the virtual machine 130 is suspended, an offset associated with the virtual machine 130 may be determined and stored when the virtual machine 130 is suspended, such that the offset may be used when resuming the virtual machine 130 so as to provide a continuous timeline for the virtual machine 130. By contrast, if such an offset was not used, the virtual machine 130 may receive time information from the clock 160 that is inaccurate (e.g., relating to a time in the past or in the future, ticking too fast or too slow, etc.). Further, in such an example, it may be necessary to intercept time requests from the virtual machine 130 (e.g., by the hypervisor 120) in order to perform additional processing as compared to merely receiving offset time information from the clock 160, thereby adding overhead.

In the example shown in FIG. 1, the hypervisor 120 is configured to communicate directly with the hardware 110 of the host machine 100. In such cases, the hypervisor 120 may be viewed as having the highest privilege level among the various other software, firmware and/or other hardware components of the host machine 100. Thus, for example, when the host machine 100 boots up, the hypervisor 120 may be the first item or component that is created, instantiated or otherwise executed on the host machine 100.

Once the hypervisor 120 is initialized, it may create one or more virtual machines 130. Each virtual machine 130 may emulate a computer system and, as such, may provide the functionality of a physical computing device. In some examples, the virtual machine 130 may include a privileged kernel 150 and a normal kernel 140.

The privileged kernel 150 may be configured to execute a secure operating system. As such, the privileged kernel 150 can run one or more secure programs that contain various secretes utilized by the virtual machine 130, the hypervisor 120, and/or the normal kernel 140. For example, the privileged kernel 150 may store various credentials, encryption keys and the like.

The normal kernel 140 may be configured to execute various "normal" programs and applications, such as, for example, word processing applications, browser applications, spreadsheet applications and so on. However, due to the less secure security configuration (e.g., when compared to the security configuration of the privileged kernel 150) of the normal kernel 140, the normal kernel 140 may not store any credentials, encryption keys, or other secrets that may be utilized by the virtual machine 130 and/or the hypervisor 120. As such, when various secrets are needed by the various applications running on the normal kernel 140, the normal kernel 140 may request those secrets from the privileged kernel 150. In another implementation, the normal kernel 140 may request that the privileged kernel 150 perform one or more actions, using one or more of the stored secrets, on behalf of the normal kernel 140 and/or one or more applications executing on the normal kernel.

In some instances and due to the hypervisor 120 executing both the privileged kernel 150 and the normal kernel 140, the hypervisor 120 may execute in a privileged context. The privileged context enables the hypervisor 120 to switch between the privileged kernel 150 and the normal kernel 140 and/or various user modes.

As the hypervisor 120 is responsible for various virtual machines 130 and each virtual machine's respective kernels, it is important that the hypervisor 120 be one of the most, if not the most secure component on the host machine 100. For example, if the hypervisor 120 is software, the hypervisor 120 may have the highest privilege level when compared to other software that may be executing on the host machine 100. In some cases, the hardware 110 provides the hypervisor 120 with privilege level architecture that enables the hypervisor 120 to run and to exert authority over every virtual machine 130 the hypervisor 120 creates. As will be explained in more detail below with respect to FIG. 3, the host machine 100 may include nested hypervisors. In such cases, the primary hypervisor may have authority over the secondary hypervisor.

In some examples, the hardware 110 may provide timer functionality, which may be used by the virtual machine 130 to set one or more timers. For example, the virtual machine 130 may set a timer for a specified time duration, which, when reached, may cause an interrupt to occur. As another example, the virtual machine 130 may set a recurring timer, such that the timer may fire periodically. However, in an example, the virtual machine 130 may be suspended before such the time duration has elapsed, such that the timer may not have fired (e.g., the timer may still be enabled). In another example, the virtual machine 130 may be suspended after the timer has fired, such that the timer may still be set but is no longer enabled. Thus, when suspending the virtual machine 130, it may be important to capture such timer information in order to be able to save and restore such information when the virtual machine 130 is suspended and resumed, respectively.

In an example, the hypervisor 120 may store one or more timers set by the virtual machine 130 while preserving various aspects of each timer. For example, the hypervisor 120 may store an expiration time, whether the most recent expiration has been signaled, and/or the enable bit for a timer. Thus, when resuming the virtual machine 130, the hypervisor 120 may set each timer at hardware 110, while retaining the stored aspects of each timer. As an example, the hypervisor 120 may set a timer while preserving the timer's enable bit, such that a timer that was enabled before suspending the virtual machine 130 may remain enabled, while a timer that was disabled before the virtual machine 130 was suspended may be disabled. As a result, timers that have already fired for the virtual machine 130 will be indicated as such by an appropriate enable bit (e.g., indicating that the timer is disabled), while timers that have yet to fire may be enabled as indicated by an appropriate enable bit. By contrast, when the virtual machine 130 sets a timer, the timer may be automatically enabled by the hardware 110, thereby causing the timer to automatically have the appropriate enable bit. As a result of the hardware 110 providing such varying modes that allow automatic and manual control over the enable bit for a timer, it may be possible to provide transparent auto-enabled timers for the virtual machine 130, while also allowing the hypervisor 120 to save and accurately restore timers.

Figure 2:
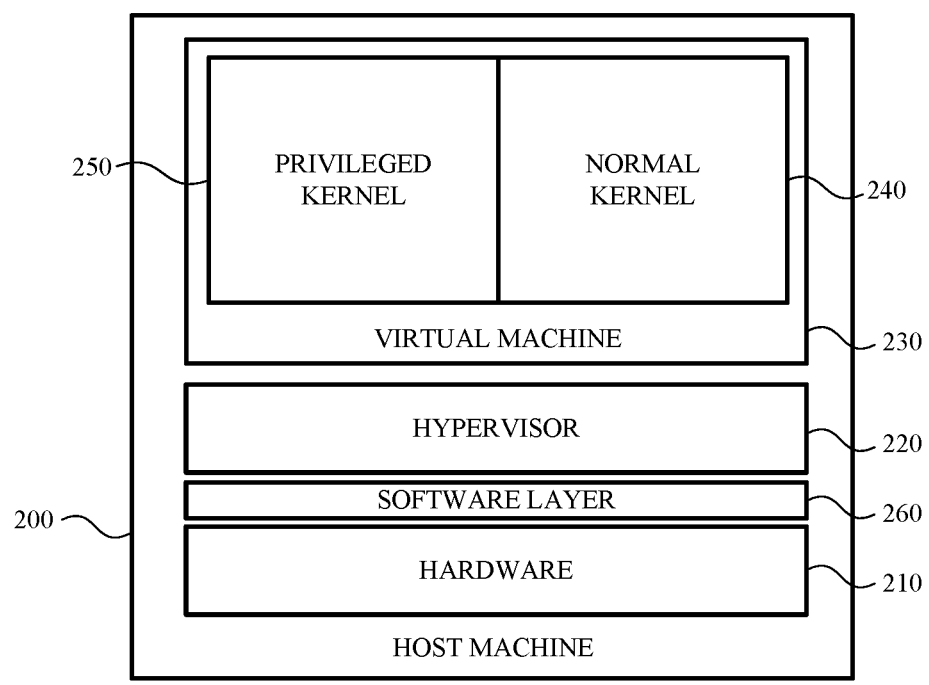
FIG. 2 illustrates another example host machine on which a software layer exists between the hypervisor and the hardware of the host machine according to an example.

FIG. 2 illustrates another example host machine 200 on which a software layer 260 exists between the hypervisor 220 and the hardware 210 of the host machine 200 according to an example. In this example, the hardware 210, the hypervisor 220 and virtual machine 230, the normal kernel 240 and the privileged kernel 250 may function in a similar manner such as was described above with respect to FIG. 1. Further, the hardware 210 may comprise a clock similar to the clock 160 described above with respect to FIG. 1. However, in this example, the host machine 200 includes a software layer 260 positioned between the hypervisor 220 and the hardware 210.

In some cases, the software layer 260 may be responsible for certain aspects of the hardware 210. For example, the software layer 260 may be responsible for putting the host machine 200 in a sleep state, resuming programs or applications when the host machine 200 awakens from a sleep state and so on.

It is also possible that the software layer 260 has a higher privilege level than the hypervisor 220. In such cases, the hypervisor 220 should be configured to communicate directly with the software layer 260. That is, any communication between the software layer 260 and any of the other components (e.g., the privileged kernel 250, the normal kernel 240 etc.) of the host machine 200 should be routed or otherwise mediated through the hypervisor 220. For example, any communication that occurs between the normal kernel 240 and the software layer 260 should be handled by the hypervisor 220.

In some cases when the software layer 260 is present, it may be desirable for the hypervisor 220 to be able to turn off or deactivate the software layer 260. For example, once the hypervisor 220 has been initialized, the hypervisor 220 may be configured to turn off the software layer 260, suspend operations performed by the software layer 260, intercept commands provided by or sent to the software layer 260 and so on. In this way, the hypervisor 220 may have the highest privilege level within the host machine 200. As such, security features of the host machine 200 may be improved as the hypervisor 220 controls communications between the various components of the host machine 200. As will also be described below, the host machine 200 may be able to determine that the hypervisor 220 was securely launched thereby preventing any attacks that may be brought to the host machine 200.

Figure 3:
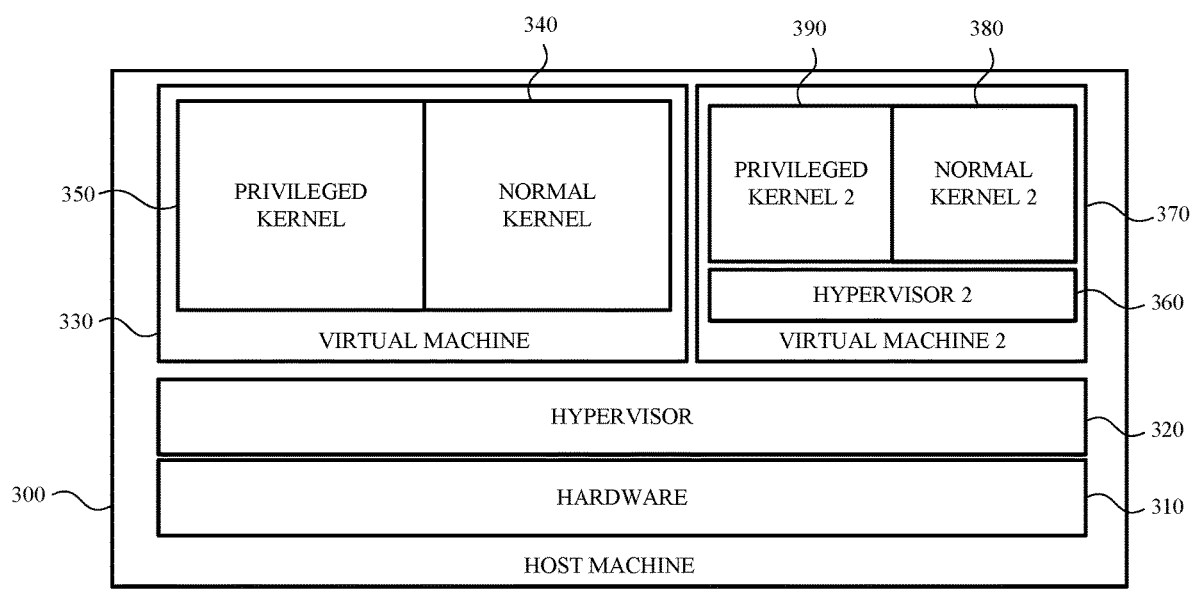
FIG. 3 illustrates an example host machine having nested hypervisors that support nested virtualization according to an example.

FIG. 3 illustrates an example host machine 300 having nested hypervisors that support nested virtualization according to an example. As shown in FIG. 3, the host machine 300 may include hardware 310 and a hypervisor 320. In some cases, the hardware 310 and the hypervisor 320 may function in a similar manner such as described above. For example, the hypervisor 320 may communicate with the hardware 310 as well as with a normal kernel 340 and a privileged kernel 350 of a virtual machine 330. Further, hardware 310 may comprise a clock similar to the clock 160 in FIG. 1, which may be used to receive time information by the hypervisor 320, the virtual machine 330, and/or the hypervisor 2 360. For example, the virtual machine 330 and/or the hypervisor 2 360 may receive "virtual time" from the hypervisor 320, which may offset and/or scale time information received from the clock according to aspects disclosed herein.

Additionally, the hypervisor 320, and/or the hardware 310, may be able to create, run, and/or command another virtual machine (shown in FIG. 3 as virtual machine 2 370) and another hypervisor (shown in FIG. 3 as hypervisor 2 360). As with the virtual machine 330, the virtual machine 2 370 may include a privileged kernel (shown in FIG. 3 as privileged kernel 2 390) and a normal kernel (shown in FIG. 3 as normal kernel 2 380). Each of these kernels may function in a similar manner to the normal kernel 140 and the privileged kernel 150 described above. In some examples, virtual time for the privileged kernel 2 390 and/or the normal kernel 2 380 of the virtual machine 2 370 may be provided by the hypervisor 2 360, which may be based on time information received from the hypervisor 320.

The hypervisor 2 360 may communicate with and run the privileged kernel 2 390 and the normal kernel 2 380 in a similar manner as described above. For example, the hypervisor 2 360 may run in a privileged context, which enables the hypervisor 2 360 to switch between the privileged kernel 2 390 and the normal kernel 2 380. The hypervisor 2 360 may believe that it is the only hypervisor in the host machine 300. However, the hypervisor 2 360 may be subject to and commanded by the hypervisor 320. That is, any communications between the hypervisor 2 360 and the hardware 310 may be passed through the hypervisor 320.

Although not shown in FIG. 3, the host machine 300 may also include a software layer, such as, for example, software layer 260 (FIG. 2). When the software layer is present, the hypervisor 2 360 should only be configured to communicate the hypervisor 320. In some cases, the hypervisor 2 360 will not be launched until a verification is received that the hypervisor 320 has been launched securely.

Regardless of the configuration of the host machine 300, a clock provided by the hardware 310 may provide a pre-specified or known frequency (e.g., determined by a crystal, as part of a processor, etc.), which may be used to provide consistent virtualized time to the virtual machine 330. As a result, if the virtual machine 330 is migrated (e.g., suspended on the host machine 300 and resumed on a different host machine, as part of a live migration, etc.) from the host machine 300 to a different host machine, an offset and/or scaling factor may be determined for the clock of hardware 310, which may be used to configure a clock of the different host machine, such that the virtual machine 330 may continue to receive consistent virtualized time information. In some examples, the different host machine may also comprise a clock having a pre-specified or known frequency, such that only the offset is required to provide consistent time information. In other examples, a multiplier or scale factor may also be used. For example, the clock of the host machine 300 may have a frequency of 1 GHz, while the clock of the different host machine may have a frequency of 250 MHz, such that a multiplier of four may be used in addition to the offset. Thus, as compared to traditional techniques, which may require complicated computations in order to translate the clock of a host machine to match the expected time information of a virtual machine, it may be possible to provide consistent time information using only an offset and, in some examples, a scale factor.

Figure 4:
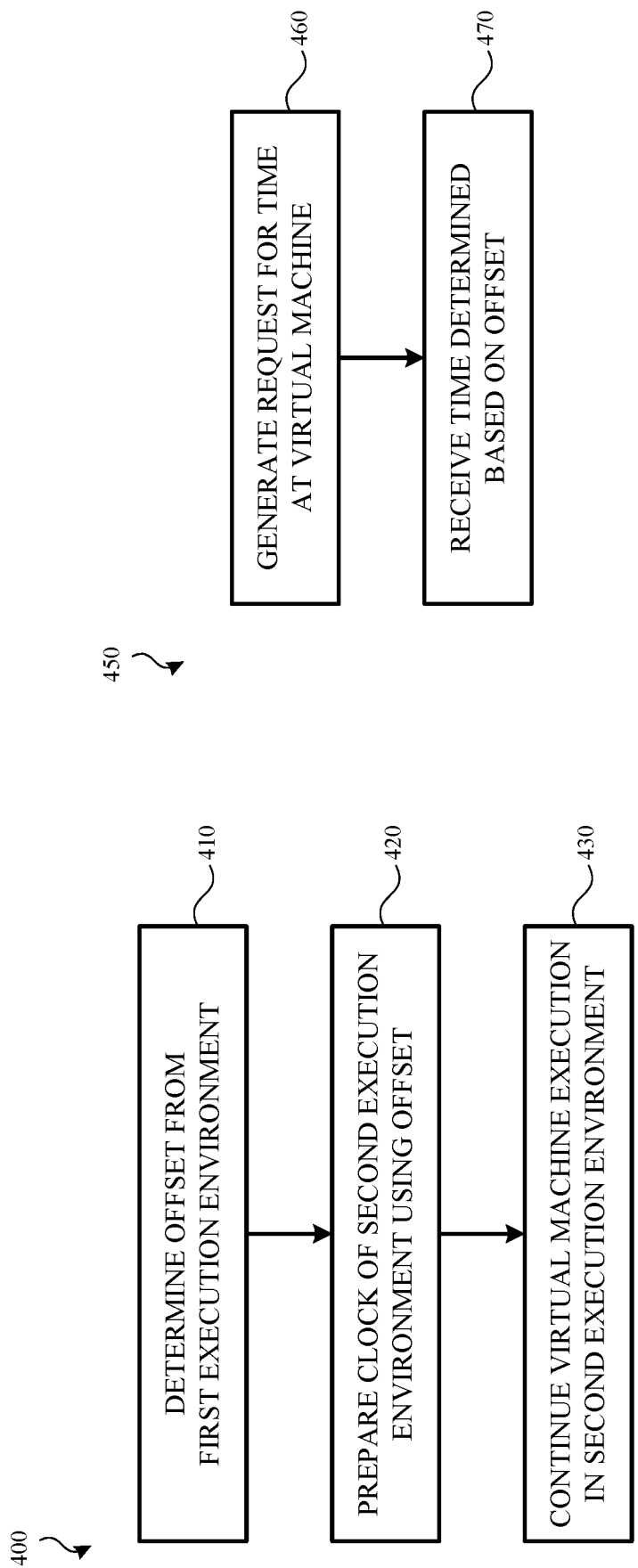
FIG. 4A illustrates an example method for continuing virtual machine execution with a counter in a new execution environment according to aspects disclosed herein.
FIG. 4B illustrates an example method for accessing a time source by a virtual machine.

FIG. 4A illustrates an example method 400 for continuing virtual machine execution with a counter in a new execution environment according to aspects disclosed herein. In some cases, the method 400 may be used by a host system, such as, for example, host system 100 (FIG. 1), host system 200 (FIG. 2), and/or host system 300 (FIG. 3).

Method 400 begins at operation 410, where an offset may be determined from a first execution environment. In an example, the execution environment may be an environment in which one or more virtual machines are executing, such as the host machine 100 in which the virtual machine 130 is executing, as described above with respect to FIG. 1. Determining the offset may comprise evaluating an offset currently used to provide virtual time to the virtual machine based on a hardware clock (e.g., the clock 160 in FIG. 1) while the virtual machine is executing. In another example, the determination may comprise accessing a saved state of the virtual machine, which may have been generated as a result of suspending the virtual machine. Thus, method 400 may apply to the live migration of a virtual machine or resuming a suspended virtual machine, among other examples. In some examples, a scale factor or frequency may also be determined, such that a clock in a subsequent execution environment may be configured to match the frequency of the first execution environment.

Flow then proceeds to operation 420, where a clock of a second execution environment may be prepared using the determined offset. In an example, the second execution environment may be a different host machine (e.g., in the case of a live migration, or resuming a suspended virtual machine on a different host machine) or may be the same host machine as provided the first execution environment (e.g., in the case of resuming a suspended virtual machine on the same host machine). In some examples, preparing the clock of the second execution environment may comprise configuring a hypervisor of the second execution environment based on the offset so as to provide consistent time information to the virtual machine from the clock of the second execution environment. In other examples, a scale factor or frequency may be used to adapt a clock of the second execution environment (e.g., either alone or in conjunction with the offset, as was described above) in order to provide a frequency similar to that of the first execution environment. For example, a clock may be configured to have the same frequency or may be scaled according to aspects disclosed herein.

Once the second execution environment has been prepared, flow proceeds to operation 430, where virtual machine execution may continue in the second execution environment. In an example, continuing execution may comprise completing a live migration of the virtual machine. In another example, execution may be continued by resuming the virtual machine in the second execution environment. As a result of applying the offset and, in some examples, the scale factor, to the second execution environment, the virtual machine may be able to obtain consistent time information from the clock of the second execution environment. Flow terminates at operation 430.

FIG. 4B illustrates an example method 450 for accessing a time source by a virtual machine. In some cases, the method 450 may be used by a virtual machine, such as, for example, virtual machine 130 (FIG. 1), virtual machine 230 (FIG. 2), and/or virtual machine 330 (FIG. 3).

Method 450 begins at operation 460, where a time request may be generated at a virtual machine. In an example, the request may be generated to determine how much time has elapsed, to generate a timestamp, to provide a system timer, or to synchronize instruction execution, among other examples. The request may be provided to a hypervisor (e.g., hypervisor 120 in FIG. 1), a virtual clock provided by a hypervisor, or a clock of a host system (e.g., host machine 100), among other examples.

At operation 470, time information may be received. In some cases, the time information may be determined based on an offset as described above. As compared to traditional techniques, determining the time information based on an offset may provide a simplified and more expedient method of providing virtualized time to a virtual machine (e.g., as compared to generating potentially inexact and/or drifting time information based on clock frequencies that may vary between host machines based on complex computations). In some examples, a multiplier may be used in order to scale a clock frequency to a pre-specified or known frequency, as was discussed above. Flow terminates at operation 470.

Figure 5:
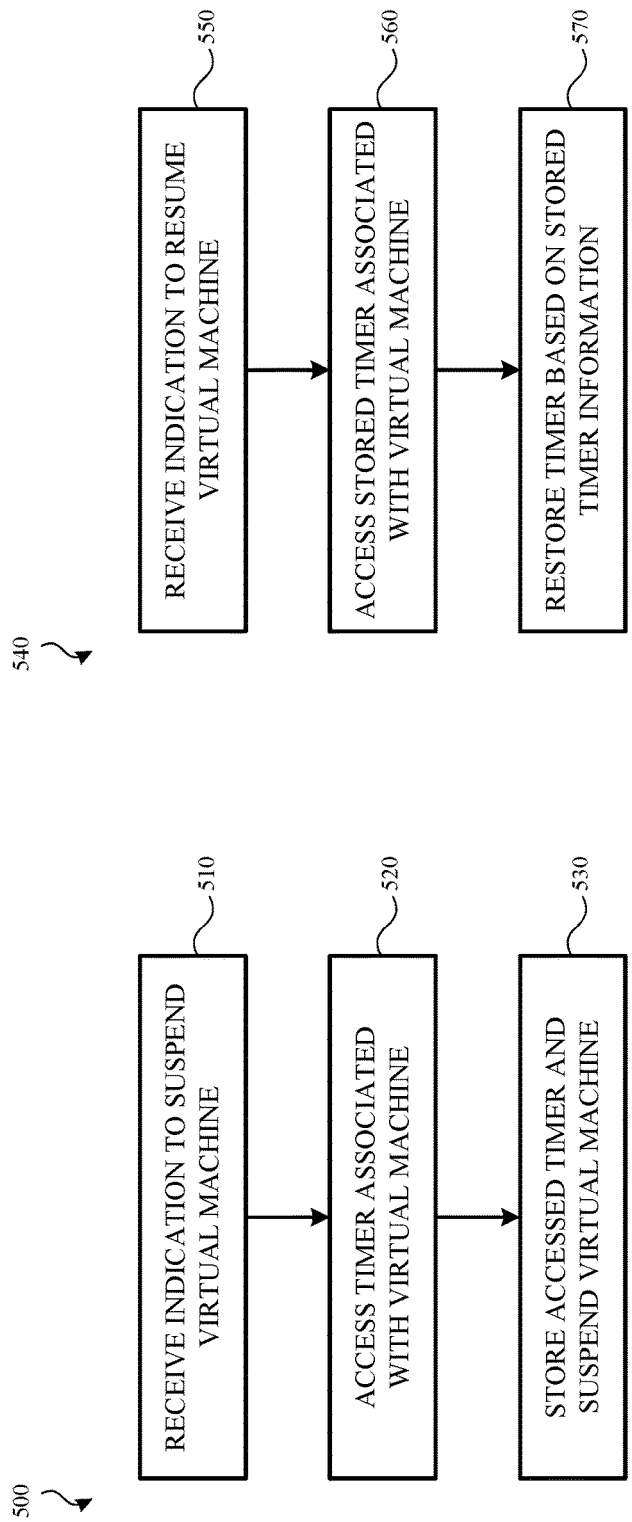
FIG. 5A illustrates an example method for saving a timer of a virtual machine.
FIG. 5B illustrates an example method for restoring a timer of a virtual machine.
FIG. 5C illustrates an example method for setting a timer for a virtual machine.

FIG. 5A illustrates an example method 500 for saving a timer of a virtual machine. In some cases, the method 500 may be used by a host system, such as, for example, host system 100 (FIG. 1), host system 200 (FIG. 2), and/or host system 300 (FIG. 3).

Method 500 begins at operation 510, where an indication may be received to suspend a virtual machine. In some examples, the indication may be received as a result of user input or in response to the occurrence of an event, among other reasons. In other examples, the indication may specify a virtual machine to suspend (e.g., based on a virtual machine identifier, a host system identifier, etc.). While method 500 is discussed with respect to suspending a virtual machine, it will be appreciated that similar techniques may be applied to performing a live migration or when one or more virtual processors of a virtual machine are moved from one physical processor to another physical processor (e.g., as may occur as part of hypervisor scheduling, load balancing, etc.), among other virtualization operations.

Flow progresses to operation 520, where a timer associated with the virtual machine may be accessed. In an example, the timer may be accessed by a hypervisor, such as hypervisor 120 in FIG. 1). Accessing the timer may comprise determining timer information associated with the timer, including, but not limited to, the state of an enable bit associated with the timer, whether the timer is a one-shot timer or a periodic timer, an interval for the timer, and/or whether the most recent expiration has been signaled, etc. In another example, the timer may be associated with one or more registers, such as a configuration register and/or a comparator register.

At operation 530, the accessed timer may be stored and the virtual machine may be suspended, such that the accessed timer information may be stored as part of a saved state for the virtual machine or otherwise associated with the virtual machine. In some examples, the timer information may be stored using a data store, a local or remote storage device, or a database, among other storage. As discussed above, the timer information may comprise information relating to whether the timer has fired and/or whether the most recent expiration of the timer has been signaled. Flow terminates at operation 530.

FIG. 5B illustrates an example method 540 for restoring a timer of a virtual machine. In some cases, the method 540 may be used by a host system, such as, for example, host system 100 (FIG. 1), host system 200 (FIG. 2), and/or host system 300 (FIG. 3).

Method 540 begins at operation 550, where an indication may be received to resume a virtual machine. In some examples, the indication may be received as a result of user input or in response to the occurrence of an event, among other reasons. In other examples, the indication may specify a virtual machine to resume (e.g., based on a virtual machine identifier, a host system identifier, etc.). While method 540 is discussed with respect to resuming a virtual machine, it will be appreciated that similar techniques may be applied to performing a live migration or when one or more virtual processors of a virtual machine are moved from one physical processor to another physical processor (e.g., as may occur as part of hypervisor scheduling, load balancing, etc.), among other virtualization operations.

Flow progresses to operation 560, where a stored timer associated with the virtual machine may be accessed. In an example, the stored timer may have been generated by performing one or more aspects of method 500 as was discussed above with respect to FIG. 5A. For example, the stored timer may be part of a saved state for the virtual machine or may be otherwise associated with the virtual machine. In some examples, the stored timer may be stored using a data store, a local or remote storage device, or a database, among other storage. The stored timer may comprise timer information (e.g., an expiration time, whether the most recent expiration has been signaled, and the enable bit, etc.) relating to the stored timer.

Moving to operation 570, the timer information may be used to restore the stored timer. For example, restoring the timer may comprise instantiating a timer at a host machine based on the timer information, and indicating that the timer should not be auto-enabled. Rather, the timer may be restored based on the state of the stored enable bit, such that a timer that was enabled when the virtual machine was suspended remains enabled, while a timer that had already fired remains in a state that indicates to the virtual machine that the most recent expiration has been signaled. Other aspects of the timer may be similarly restored, such as the expiration time, whether the most recent expiration has been signaled, and/or whether the timer is a one-shot or periodic timer, etc. As a result, rather than requiring a hypervisor for the virtual machine to provide a synthetic timer that retains the state of a virtual machine's timer, it may be possible to restore the state of the timer by indicating that the timer should not be auto-enabled but should instead retain the enable bit as of when the virtual machine was suspended. Flow terminates at operation 570.

FIG. 5C illustrates an example method 580 for setting a timer for a virtual machine. In some cases, the method 580 may be used by a host system, such as, for example, host system 100 (FIG. 1), host system 200 (FIG. 2), and/or host system 300 (FIG. 3).

Method 580 begins at operation 585, where a request to set a timer may be received from a virtual machine. In some examples, the request may be received by hardware of a host machine from a virtual machine or from a hypervisor on behalf of a virtual machine. The request may comprise an indication of whether the timer is a one-shot timer or a periodic timer, as well as a timer interval or expiration time, among other information.

Moving to operation 590, a timer may be set based on the received request, wherein setting the timer may comprise automatically setting the enable bit for the timer to indicate that the timer is enabled but has not yet fired. By contrast, method 540 discussed above did not result in automatically setting the enable bit to indicate that the timer was enabled, given that the timer had a previous state by virtue of representing the state of a suspended virtual machine. However, in method 580, the virtual machine contemporaneously requests the timer to be set, such that automatically enabling the timer provides the expected behavior to the virtual machine. Thus, it may be possible to provide transparent auto-enabled timers for a virtual machine according to method 580, while also providing functionality to save and accurately restore timers according to method 540. Flow terminates at operation 590.

FIG. 6-FIG. 9 and their associated descriptions provide a discussion of a variety of operating environments in which aspects of the disclosure may be practiced. However, the devices and systems illustrated and discussed with respect to FIG. 6-FIG. 9 are for purposes of example and illustration and are not limiting of a vast number of electronic device configurations that may be utilized for practicing aspects of the disclosure, as described herein.

Figure 6:
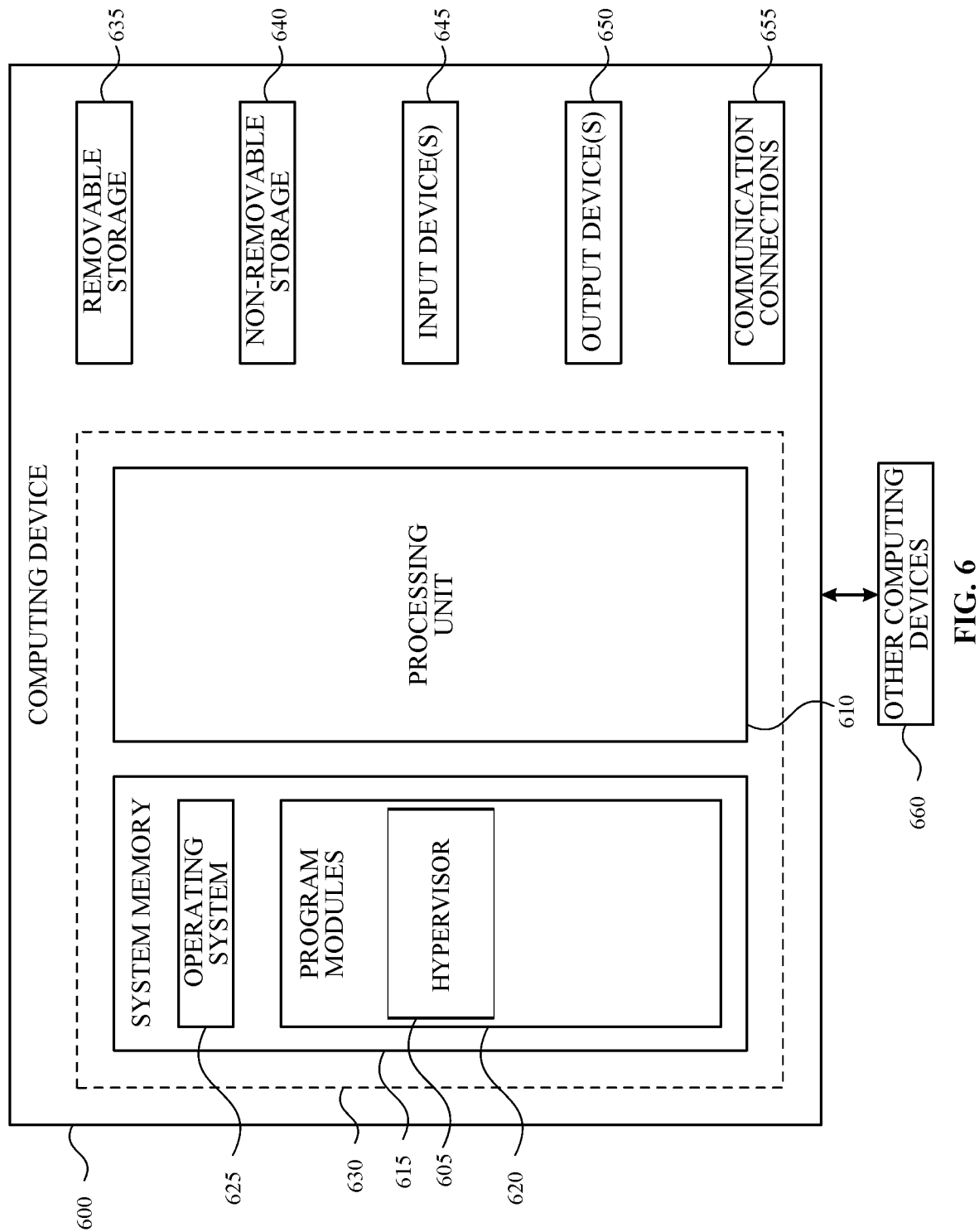
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device 600 may be similar to the host machine 100 described above with respect to FIG. 1.

In a basic configuration, the computing device 600 may include at least one processing unit 610 and a system memory 615. Depending on the configuration and type of computing device 600, the system memory 615 may comprise, but is not limited to, volatile storage (e.g., random access memory), non-volatile storage (e.g., read-only memory), flash memory, or any combination of such memories. The system memory 615 may include an operating system 625 and one or more program modules 620 or components suitable for identifying various objects contained within captured images such as described herein.

The operating system 625, for example, may be suitable for controlling the operation of the computing device 600. Furthermore, examples of the disclosure may be practiced in conjunction with a graphics library, other operating systems, or any other application program and is not limited to any particular application or system. This basic configuration is illustrated in FIG. 6 by those components within a dashed line 630.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 635 and a non-removable storage device 640.

As stated above, a number of program modules and data files may be stored in the system memory 615. While executing on the processing unit 610, the program modules 620 (e.g., a hypervisor 605) may perform processes including, but not limited to, the aspects, as described herein.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the computing device 600 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The computing device 600 may also have one or more input device(s) 645 such as a keyboard, a trackpad, a mouse, a pen, a sound or voice input device, a touch, force and/or swipe input device, etc. The output device(s) 650 such as a display, speakers, a printer, etc. may also be included. The aforementioned devices are examples and others may be used. The electronic device 600 may include one or more communication connections 655 allowing communications with other computing devices 660. Examples of suitable communication connections 655 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 615, the removable storage device 635, and the non-removable storage device 640 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
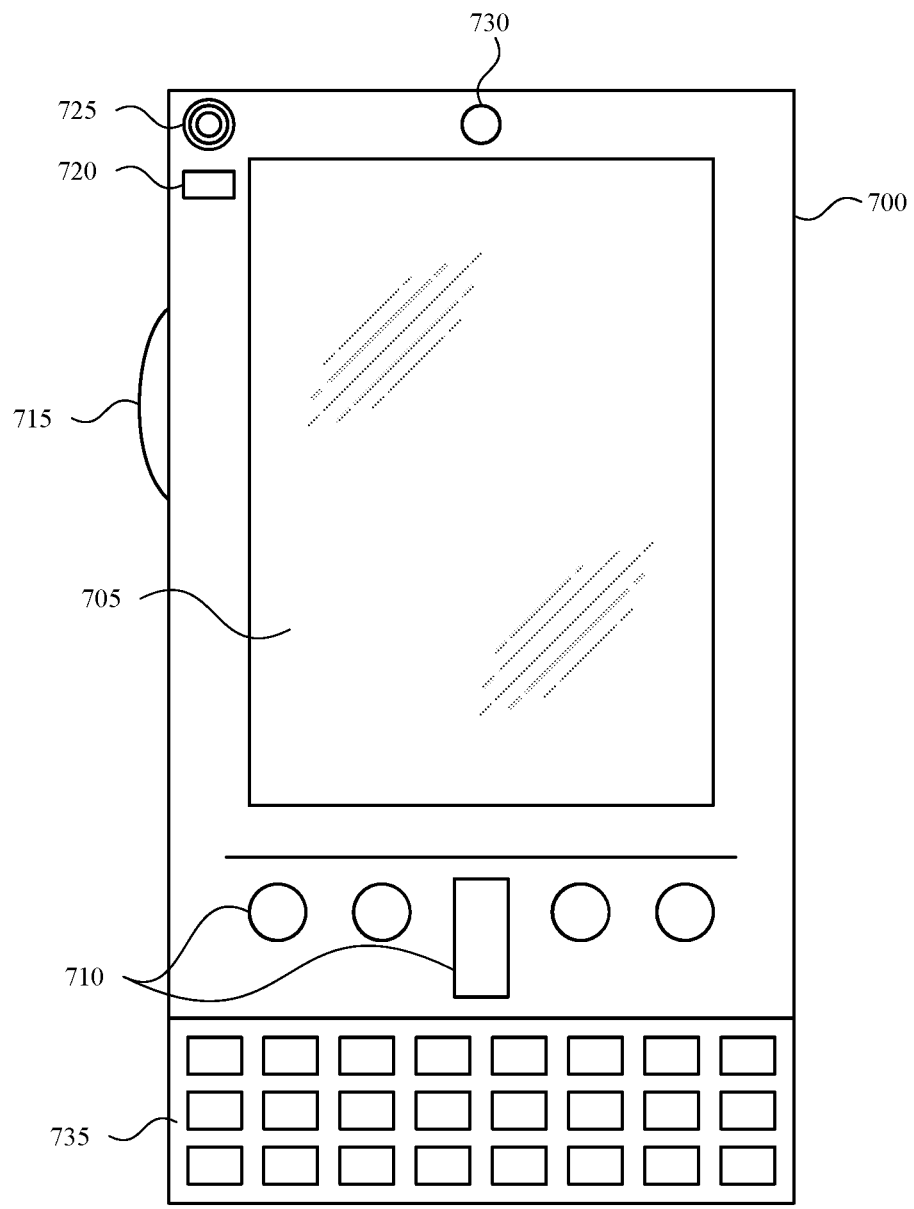
FIGS. 7A and 7B are simplified block diagrams of a mobile computing device with which aspects of the present disclosure may be practiced.
Figure 7B:
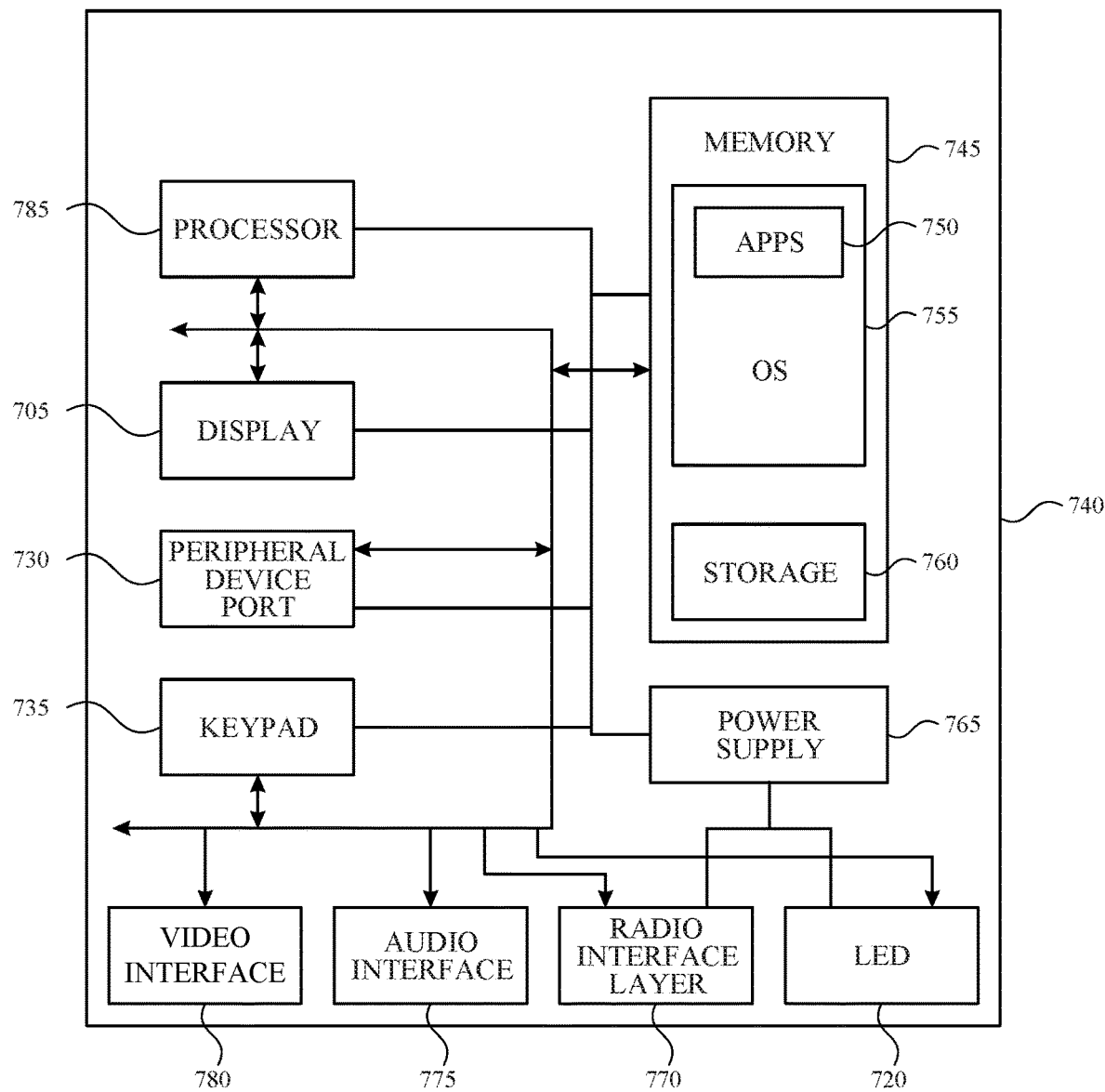

FIGS. 7A and 7B illustrate a mobile computing device 700, for example, a mobile telephone, a smart phone, wearable computer (such as a smart watch), a tablet computer, a laptop computer, and the like, with which examples of the disclosure may be practiced. With reference to FIG. 7A, one aspect of a mobile computing device 700 for implementing the aspects is illustrated.

In a basic configuration, the mobile computing device 700 is a handheld computer having both input elements and output elements. The mobile computing device 700 typically includes a display 705 and one or more input buttons 710 that allow an individual to enter information into the mobile computing device 700. The display 705 of the mobile computing device 700 may also function as an input device (e.g., a display that accepts touch and/or force input).

If included, an optional side input element 715 allows further input. The side input element 715 may be a rotary switch, a button, or any other type of manual input element. In alternative aspects, mobile electronic device 700 may incorporate more or less input elements. For example, the display 705 may not be a touch screen in some examples. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various examples, the output elements include the display 705 for showing a graphical user interface (GUI) (such as the one described above that provides visual representation of a determined pronunciation and may receive feedback or other such input, a visual indicator 720 (e.g., a light emitting diode), and/or an audio transducer 725 (e.g., a speaker). In some aspects, the mobile computing device 700 incorporates a vibration transducer for providing an individual with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device 700. That is, the mobile computing device 700 can incorporate a system (e.g., an architecture) 740 to implement some aspects. In one embodiment, the system 740 is implemented as a "smart phone" capable of running one or more applications (e.g., browser, e-mail, calendaring, contact managers, messaging clients, games, media clients/players, content selection and sharing applications and so on). In some aspects, the system 740 is integrated as an electronic device, such as an integrated personal digital assistant (PDA) and wireless phone.

One or more application programs 750 may be loaded into the memory 745 and run on or in association with the operating system 755. Examples of the application programs include phone dialer programs, e-mail programs, personal information management (PIM) programs, word processing programs, spreadsheet programs, Internet browser programs, messaging programs, and so forth.

The system 740 also includes a non-volatile storage area 760 within the memory 745. The non-volatile storage area 760 may be used to store persistent information that should not be lost if the system 740 is powered down.

The application programs 750 may use and store information in the non-volatile storage area 760, such as email or other messages used by an email application, and the like. A synchronization application (not shown) also resides on the system 740 and is programmed to interact with a corresponding synchronization application resident on a host computer to keep the information stored in the non-volatile storage area 760 synchronized with corresponding information stored at the host computer.

The system 740 has a power supply 765, which may be implemented as one or more batteries. The power supply 765 may further include an external power source, such as an AC adapter or a powered docking cradle that supplements or recharges the batteries.

The system 740 may also include a radio interface layer 770 that performs the function of transmitting and receiving radio frequency communications. The radio interface layer 770 facilitates wireless connectivity between the system 740 and the "outside world," via a communications carrier or service provider. Transmissions to and from the radio interface layer 770 are conducted under control of the operating system 755. In other words, communications received by the radio interface layer 770 may be disseminated to the application programs 750 via the operating system 755, and vice versa.

The visual indicator 720 may be used to provide visual notifications, and/or an audio interface 775 may be used for producing audible notifications via an audio transducer (e.g., audio transducer 725 illustrated in FIG. 7A). In the illustrated embodiment, the visual indicator 720 is a light emitting diode (LED) and the audio transducer 725 may be a speaker. These devices may be directly coupled to the power supply 765 so that when activated, they remain on for a duration dictated by the notification mechanism even though the processor 785 and other components might shut down for conserving battery power. The LED may be programmed to remain on indefinitely until the individual takes action to indicate the powered-on status of the device.

The audio interface 775 is used to provide audible signals to and receive audible signals from the individual (e.g., voice input such as described above). For example, in addition to being coupled to the audio transducer 725, the audio interface 775 may also be coupled to a microphone to receive audible input, such as to facilitate a telephone conversation. In accordance with examples of the present disclosure, the microphone may also serve as an audio sensor to facilitate control of notifications, as will be described below.

The system 740 may further include a video interface 780 that enables an operation of peripheral device 730 (e.g., on-board camera) to record still images, video stream, and the like.

A mobile computing device 700 implementing the system 740 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 760.

Data/information generated or captured by the mobile computing device 700 and stored via the system 740 may be stored locally on the mobile computing device 700, as described above, or the data may be stored on any number of storage media that may be accessed by the device via the radio interface layer 770 or via a wired connection between the mobile electronic device 700 and a separate electronic device associated with the mobile computing device 700, for example, a server computer in a distributed computing network, such as the Internet. As should be appreciated such data/information may be accessed via the mobile computing device 700 via the radio interface layer 770 or via a distributed computing network. Similarly, such data/information may be readily transferred between electronic devices for storage and use according to well-known data/information transfer and storage means, including electronic mail and collaborative data/information sharing systems.

As should be appreciated, FIG. 7A and FIG. 7B are described for purposes of illustrating the present methods and systems and is not intended to limit the disclosure to a particular sequence of steps or a particular combination of hardware or software components.

Figure 8:
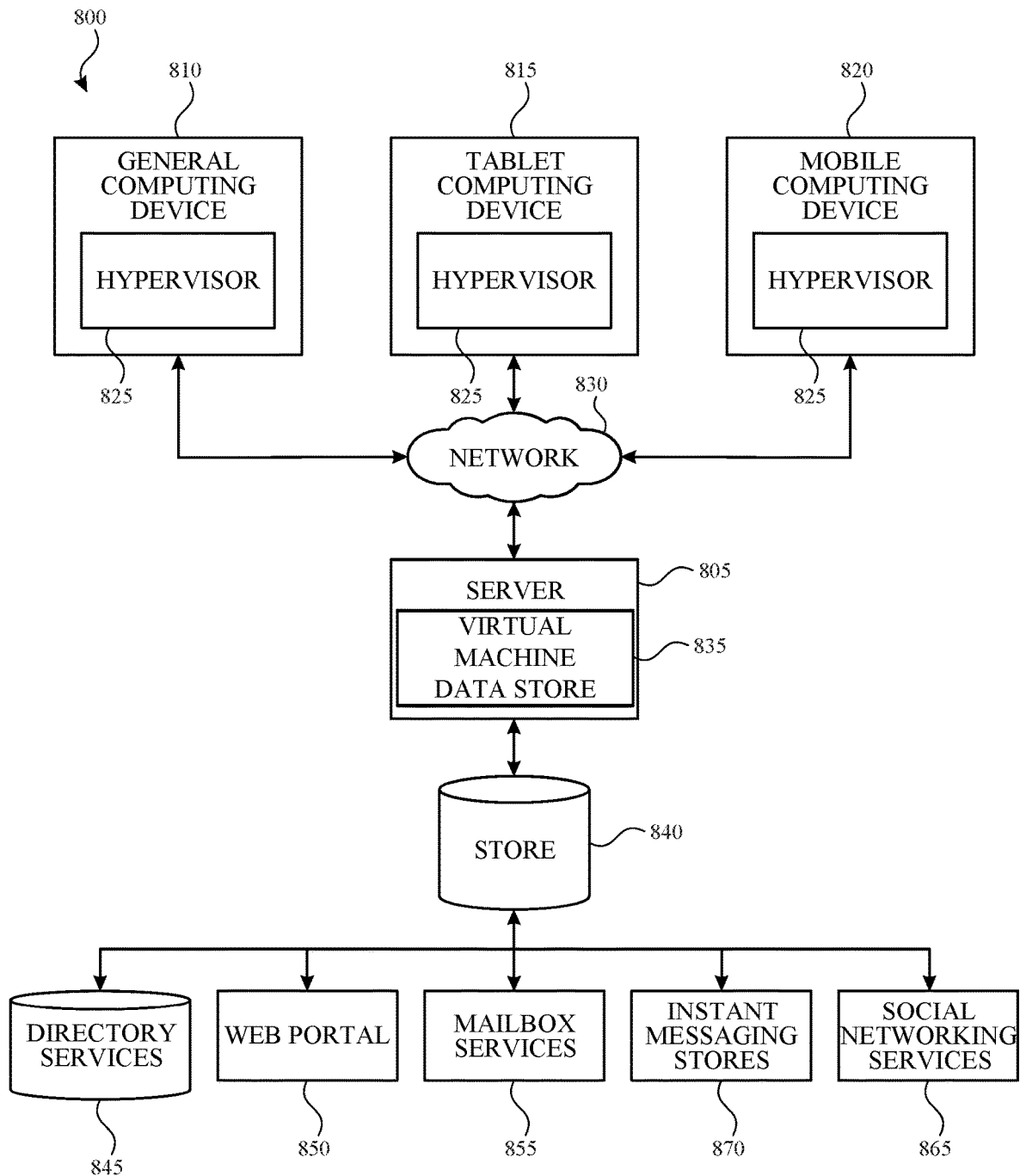
FIG. 8 is a simplified block diagram of a distributed computing system in which aspects of the present disclosure may be practiced.

FIG. 8 illustrates one aspect of the architecture of a system 800 for providing virtualization using a plurality of computing devices. The system 800 may include a general computing device 810 (e.g., personal computer), tablet computing device 815, or mobile computing device 820, as described above. Each of these devices may include a hypervisor 825 such as described herein.

In some aspects, each of the general computing device 810 (e.g., personal computer), tablet computing device 815, or mobile computing device 820 may receive various other types of information or content that is stored by or transmitted from a directory service 845, a web portal 850, mailbox services 855, instant messaging stores 860, or social networking services 865.

In aspects, and as described above, each computing device may have access to a virtual machine data store 835 (e.g., storing timer information, offset and/or frequency information, etc.) that is provided on a server 805, the cloud or some other remote computing device.

By way of example, the aspects described above may be embodied in a general computing device 810, a tablet computing device 815 and/or a mobile computing device 820. Any of these examples of the electronic devices may obtain content from or provide data to the store 840.

As should be appreciated, FIG. 8 is described for purposes of illustrating the present methods and systems and is not intended to limit the disclosure to a particular sequence of steps or a particular combination of hardware or software components.

Figure 9:
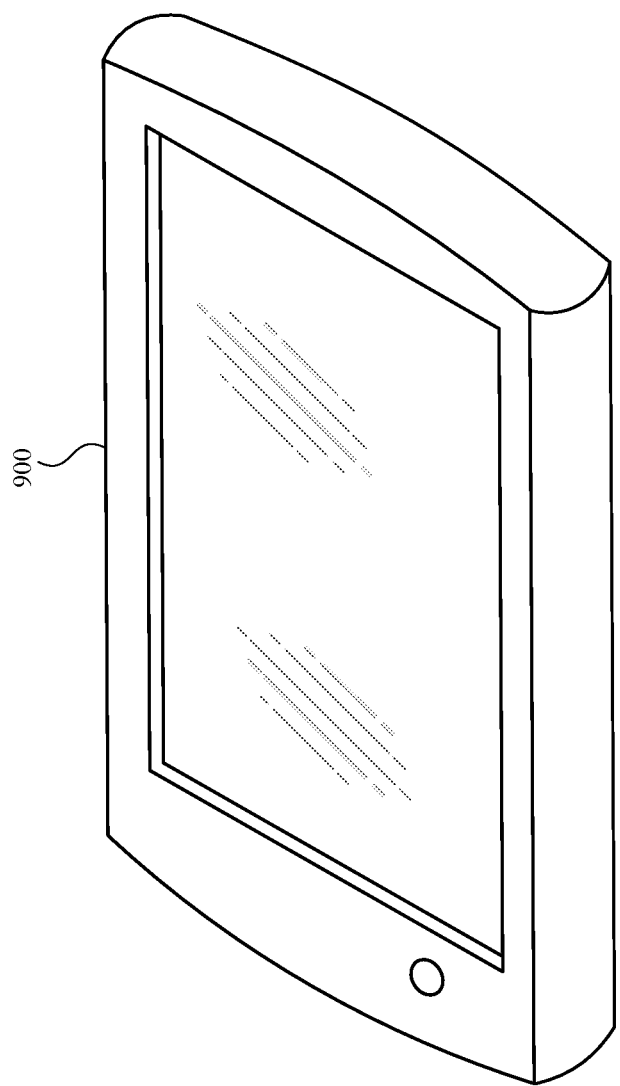
FIG. 9 illustrates a tablet computing device for executing one or more aspects of the present disclosure.

FIG. 9 illustrates an example tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices. For example, user interfaces and information of various types may be displayed and interacted with on a wall surface onto which user interfaces and information of various types are projected. Interaction with the multitude of computing systems with which examples of the invention may be practiced include, keystroke entry, touch screen entry, voice or other audio entry, gesture entry where an associated electronic device is equipped with detection (e.g., camera) functionality for capturing and interpreting gestures for controlling the functionality of the electronic device, and the like.

As should be appreciated, the figures herein FIG. 9 is described for purposes of illustrating the present methods and systems and is not intended to limit the disclosure to a particular sequence of steps or a particular combination of hardware or software components.

As will be understood from the foregoing disclosure, one aspect of the technology relates to a system comprising: at least one processor; and a memory storing instructions that, when executed by the at least one processor, perform a method. The method comprises: accessing timer information for a first timer associated with a virtual machine, wherein the timer information comprises information relating to an enable bit for the first timer; generating, at a host machine, a second timer based on the timer information, wherein generating the second timer comprises setting an enable bit of the second timer based on the timer information for the first timer; resuming execution of the virtual machine; receiving a request to set a timer from the virtual machine; and generating, at the host machine, a third timer based on the request, wherein generating the third timer comprises automatically setting an enable bit of the third timer to indicate the third timer is enabled. In an example, the method further comprises: based on determining the enable bit of the second timer indicates the timer is enabled, providing, to the virtual machine, an indication that the second timer fired. In another example, the timer information further comprises at least one of: an expiration time for the first timer; and whether the most recent expiration of the first timer has been signaled. In a further example, generating the second timer is performed by a hypervisor of the host machine. In yet another example, timer information is accessed from a saved state associated with the virtual machine. In a further still example, the timer information is accessed from an execution environment of the virtual machine during a live migration. In another example, generating the second timer comprises at least one of: setting an expiration time of the second timer based on the expiration time for the first timer; and storing an indication that a most recent expiration of the second timer has been signaled based on whether the most recent expiration of the first timer has been signaled.

In another aspect, the technology relates to a method for restoring a timer for a virtual machine. The method comprises: accessing timer information for a first timer associated with the virtual machine, wherein the timer information comprises information relating to an enable bit for the first timer; generating, at a host machine, a second timer based on the timer information, wherein generating the second timer comprises setting an enable bit of the second timer based on the timer information for the first timer; resuming execution of the virtual machine at the host machine; and based on determining the enable bit of the second timer indicates the timer is enabled, providing, to the virtual machine, an indication that the second timer fired. In an example, the method further comprises: receiving a request to set a timer from the virtual machine; and generating, at the host machine, a third timer based on the request, wherein generating the third timer comprises automatically setting an enable bit of the third timer to indicate the third timer is enabled. In another example, the timer information further comprises at least one of: an expiration time for the first timer; and whether the most recent expiration of the first timer has been signaled. In a further example, generating the second timer is performed by a hypervisor of the host machine. In yet another example, the timer information is accessed from a saved state associated with the virtual machine. In a further still example, the timer information is accessed from an execution environment of the virtual machine during a live migration. In another example, generating the second timer comprises at least one of: setting an expiration time of the second timer based on the expiration time for the first timer; and storing an indication that a most recent expiration of the second timer has been signaled based on whether the most recent expiration of the first timer has been signaled.

In another aspect, the technology relates to another method for restoring a timer for a virtual machine. The method comprises: accessing timer information for a first timer associated with the virtual machine, wherein the timer information comprises information relating to an enable bit for the first timer; generating, at a host machine, a second timer based on the timer information, wherein generating the second timer comprises setting an enable bit of the second timer based on the timer information for the first timer; resuming execution of the virtual machine; receiving a request to set a timer from the virtual machine; and generating, at the host machine, a third timer based on the request, wherein generating the third timer comprises automatically setting an enable bit of the third timer to indicate the third timer is enabled. In an example, the method further comprises: based on determining the enable bit of the second timer indicates the timer is enabled, providing, to the virtual machine, an indication that the second timer fired. In another example, the timer information further comprises at least one of: an expiration time for the first timer; and whether the most recent expiration of the first timer has been signaled. In a further example, the timer information is accessed from a saved state associated with the virtual machine. In yet another example, the timer information is accessed from an execution environment of the virtual machine during a live migration. In a further still example, generating the second timer comprises at least one of: setting an expiration time of the second timer based on the expiration time for the first timer; and storing an indication that a most recent expiration of the second timer has been signaled based on whether the most recent expiration of the first timer has been signaled.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Additionally, each operation in the described methods may be performed in different orders and/or concurrently, simultaneously or substantially simultaneously with other operations.

Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system comprising:
    at least one processor; and
    a memory storing instructions that, when executed by the at least one processor, perform a method, comprising:
        accessing timer information for a first timer associated with a virtual machine, wherein the timer information comprises information relating to an enable bit for the first timer;
        generating, at a host machine, a second timer based on the timer information, wherein generating the second timer comprises setting an enable bit of the second timer based on the timer information for the first timer;
        resuming execution of the virtual machine;
        receiving a request to set a timer from the virtual machine; and
        generating, at the host machine, a third timer based on the request, wherein generating the third timer comprises automatically setting an enable bit of the third timer to indicate the third timer is enabled.

2. The system of claim 1, wherein the method further comprises:
    based on determining the enable bit of the second timer indicates the timer is enabled, providing, to the virtual machine, an indication that the second timer fired.

3. The system of claim 1, wherein the timer information further comprises at least one of:
    an expiration time for the first timer; and
    whether the most recent expiration of the first timer has been signaled.

4. The system of claim 1, wherein generating the second timer is performed by a hypervisor of the host machine.

5. The system of claim 1, wherein the timer information is accessed from a saved state associated with the virtual machine.

6. The system of claim 1, wherein the timer information is accessed from an execution environment of the virtual machine during a live migration.

7. The system of claim 3, wherein generating the second timer comprises at least one of:
    setting an expiration time of the second timer based on the expiration time for the first timer; and
    storing an indication that a most recent expiration of the second timer has been signaled based on whether the most recent expiration of the first timer has been signaled.

8. A method for restoring a timer for a virtual machine, comprising:
    accessing timer information for a first timer associated with the virtual machine, wherein the timer information comprises information relating to an enable bit for the first timer;
    generating, at a host machine, a second timer based on the timer information, wherein generating the second timer comprises setting an enable bit of the second timer based on the timer information for the first timer;
    resuming execution of the virtual machine at the host machine; and
    based on determining the enable bit of the second timer indicates the timer is enabled, providing, to the virtual machine, an indication that the second timer fired.

9. The method of claim 8, further comprising:
    receiving a request to set a timer from the virtual machine; and
    generating, at the host machine, a third timer based on the request, wherein generating the third timer comprises automatically setting an enable bit of the third timer to indicate the third timer is enabled.

10. The method of claim 8, wherein the timer information further comprises at least one of:
    an expiration time for the first timer; and
    whether the most recent expiration of the first timer has been signaled.

11. The method of claim 8, wherein generating the second timer is performed by a hypervisor of the host machine.

12. The method of claim 8, wherein the timer information is accessed from a saved state associated with the virtual machine.

13. The method of claim 8, wherein the timer information is accessed from an execution environment of the virtual machine during a live migration.

14. The method of claim 10, wherein generating the second timer comprises at least one of:
    setting an expiration time of the second timer based on the expiration time for the first timer; and
    storing an indication that a most recent expiration of the second timer has been signaled based on whether the most recent expiration of the first timer has been signaled.

15. A method for restoring a timer for a virtual machine, comprising:
    accessing timer information for a first timer associated with the virtual machine, wherein the timer information comprises information relating to an enable bit for the first timer;
    generating, at a host machine, a second timer based on the timer information, wherein generating the second timer comprises setting an enable bit of the second timer based on the timer information for the first timer;
    resuming execution of the virtual machine;
    receiving a request to set a timer from the virtual machine; and
    generating, at the host machine, a third timer based on the request, wherein generating the third timer comprises automatically setting an enable bit of the third timer to indicate the third timer is enabled.

16. The method of claim 15, further comprising:
    based on determining the enable bit of the second timer indicates the timer is enabled, providing, to the virtual machine, an indication that the second timer fired.

17. The method of claim 15, wherein the timer information further comprises at least one of:
    an expiration time for the first timer; and
    whether the most recent expiration of the first timer has been signaled.

18. The method of claim 15, wherein the timer information is accessed from a saved state associated with the virtual machine.

19. The method of claim 15, wherein the timer information is accessed from an execution environment of the virtual machine during a live migration.

20. The method of claim 17, wherein generating the second timer comprises at least one of:
    setting an expiration time of the second timer based on the expiration time for the first timer; and storing an indication that a most recent expiration of the second timer has been signaled based on whether the most recent expiration of the first timer has been signaled.

* * * * *